(12) United States Patent
Hasan et al.

(10) Patent No.: US 11,536,361 B2
(45) Date of Patent: Dec. 27, 2022

(54) MODULAR GEARBOX FOR WIND TURBINE

(71) Applicant: General Electric Company, Schenectady, NY (US)

(72) Inventors: Raed Zuhair Hasan, Greenville, SC (US); Ian David Wilson, Simpsonville, SC (US); Lawrence Keith Taliaferro, Greenville, SC (US); Boobalan Ayyasamy, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 709 days.

(21) Appl. No.: 15/915,306

(22) Filed: Mar. 8, 2018

(65) Prior Publication Data

US 2019/0277393 A1 Sep. 12, 2019

(51) Int. Cl.
  *F03D 15/00* (2016.01)
  *F16H 57/025* (2012.01)
  (Continued)

(52) U.S. Cl.
  CPC ........... *F16H 57/025* (2013.01); *F03D 15/00* (2016.05); *F03D 80/50* (2016.05); *F03D 1/00* (2013.01);
  (Continued)

(58) Field of Classification Search
  CPC ............. F16H 57/025; F16H 2057/005; F16H 2057/0062; F16H 2057/00278;
  (Continued)

(56) References Cited

U.S. PATENT DOCUMENTS 7,789,189 B2 * 9/2010 Bigg ...................... B60K 17/00
    180/377
7,944,079 B1 5/2011 Signore et al.
    (Continued)

FOREIGN PATENT DOCUMENTS

EP    1 045 139 A2   10/2000
EP     1617075 A1    1/2006
    (Continued)

OTHER PUBLICATIONS https://www.youtube.com/watch?v=-2m80nuC5-g.
    (Continued)

*Primary Examiner* — David E Sosnowski
*Assistant Examiner* — Theodore C Ribadeneyra
(74) *Attorney, Agent, or Firm* — Dority & Manning, P.A.

(57) ABSTRACT

A modular gearbox assembly for a wind turbine having improved up-tower serviceability includes a low-speed gear stage module, a separate, intermediate-speed gear stage module adjacent to the low-speed gear stage module, and a separate high-speed gear stage module adjacent to the intermediate-speed gear stage module. The gearbox assembly also includes a first flange removably connecting the intermediate and high-speed gear stage modules and a second flange removably connecting the intermediate and low-speed gear stage modules. Thus, the low-speed gear stage module converts a low-speed, high torque input from a rotor shaft of the wind turbine to a high-speed, low torque output for a generator of the wind turbine via the intermediate and high-speed gear stage modules. In addition, the first and second flanges allow for easy disassembly of the gear stage modules such that the various stages can be easily repaired, replaced, and/or inspected.

8 Claims, 14 Drawing Sheets

(51) Int. Cl.
*F03D 80/50* (2016.01)
*F16H 57/02* (2012.01)
*F03D 1/00* (2006.01)
*F16H 57/023* (2012.01)
*F16H 57/00* (2012.01)

(52) U.S. Cl.
CPC ....... *F05B 2230/60* (2013.01); *F05B 2230/70* (2013.01); *F05B 2230/80* (2013.01); *F05B 2260/4031* (2013.01); *F05B 2260/40311* (2013.01); *F16H 2057/005* (2013.01); *F16H 2057/0062* (2013.01); *F16H 2057/0235* (2013.01); *F16H 2057/02078* (2013.01)

(58) Field of Classification Search
CPC .. F16H 2057/0235; F03D 15/00; F03D 80/50; F03D 1/00; F05B 2230/60; F05B 2230/70; F05B 2230/80; F05B 2260/4031; F05B 2260/40311
See application file for complete search history.

(56) References Cited

U.S. PATENT DOCUMENTS

| | | | |
|---|---|---|---|
| 8,500,400 B2 | 8/2013 | Signore et al. | |
| 10,508,643 B2* | 12/2019 | Hansen | F03D 13/10 |
| 2006/0138780 A1* | 6/2006 | Flamang | F03D 15/00 290/55 |
| 2009/0261594 A1* | 10/2009 | Christensen | F03D 80/70 290/55 |
| 2010/0113210 A1* | 5/2010 | Lopez | F16H 1/2845 475/331 |
| 2010/0275442 A1* | 11/2010 | Ohl, Jr. | B23P 19/04 29/889.1 |
| 2011/0133473 A1* | 6/2011 | Signore | F03D 80/70 290/55 |
| 2012/0024068 A1 | 2/2012 | Silliman et al. | |
| 2013/0178326 A1 | 7/2013 | Franke et al. | |
| 2013/0217535 A1* | 8/2013 | Suzuki | F16H 57/082 475/331 |
| 2014/0186183 A1 | 7/2014 | Mogensen et al. | |

FOREIGN PATENT DOCUMENTS

| | | |
|---|---|---|
| EP | 2 273 112 A2 | 1/2011 |
| KR | 2010 0080010 A | 7/2010 |
| WO | WO 2018/091019 A1 | 5/2018 |

OTHER PUBLICATIONS

U.S. Appl. No. 15/807,761, filed Nov. 9, 2017.
U.S. Appl. No. 15/807,823, filed Nov. 9, 2017.
PCT Search Report, dated May 28, 2019.

* cited by examiner

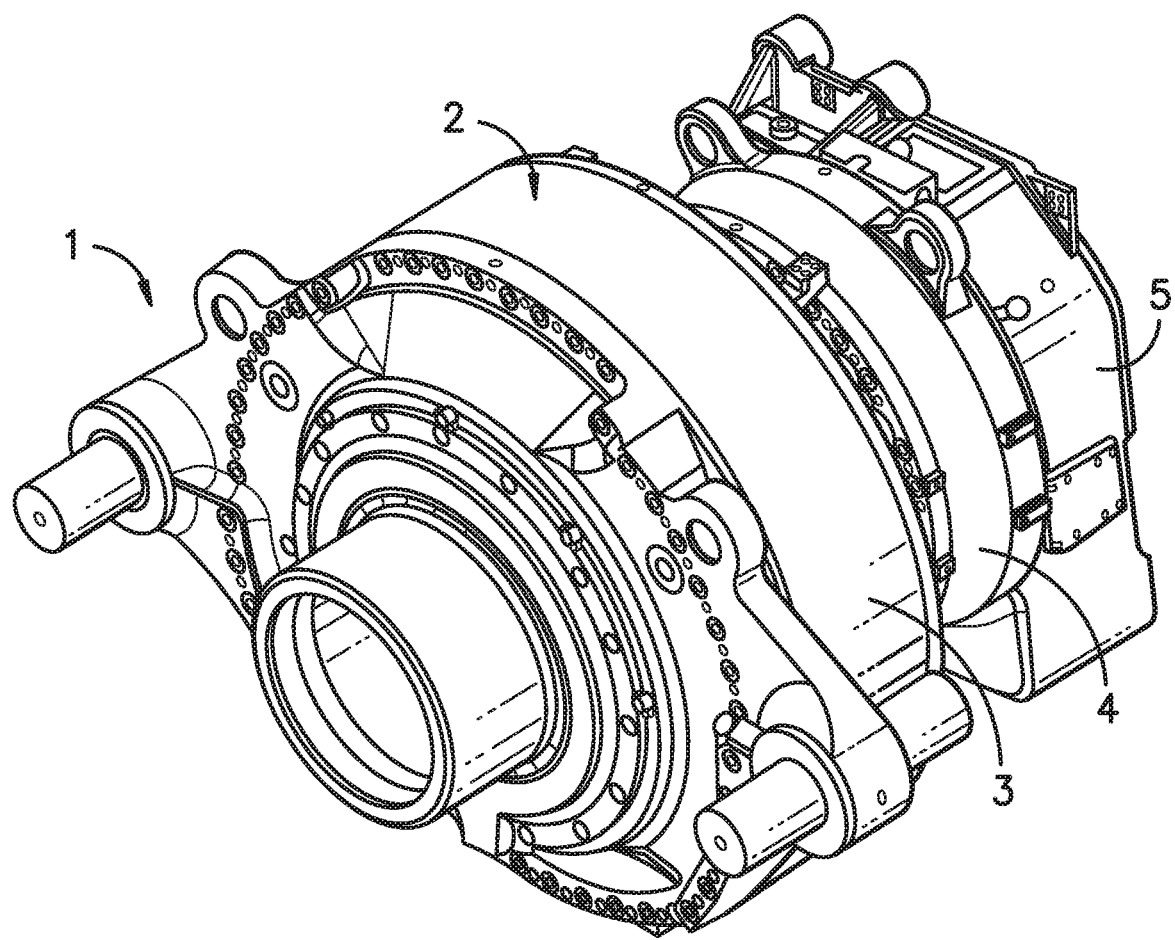
FIG. -1-
PRIOR ART

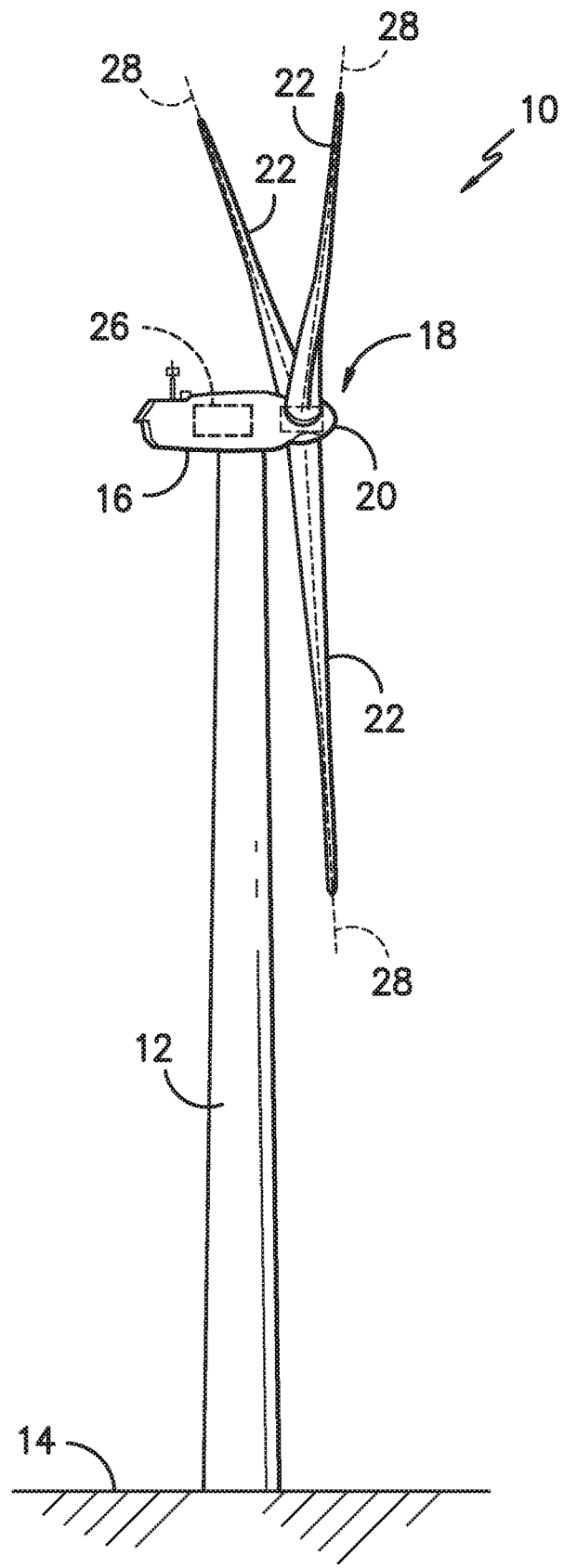
FIG. -2-

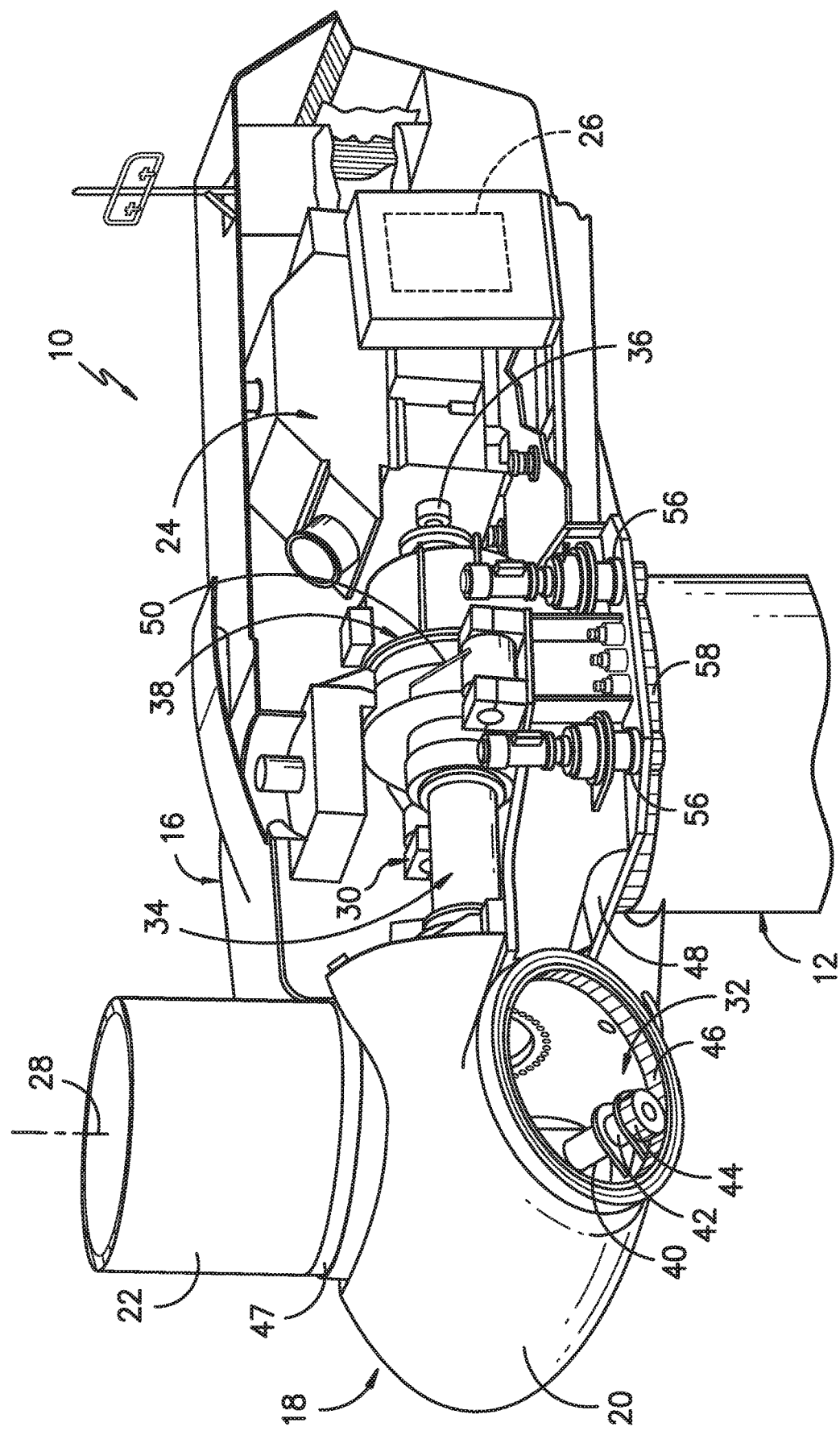
FIG. -3-

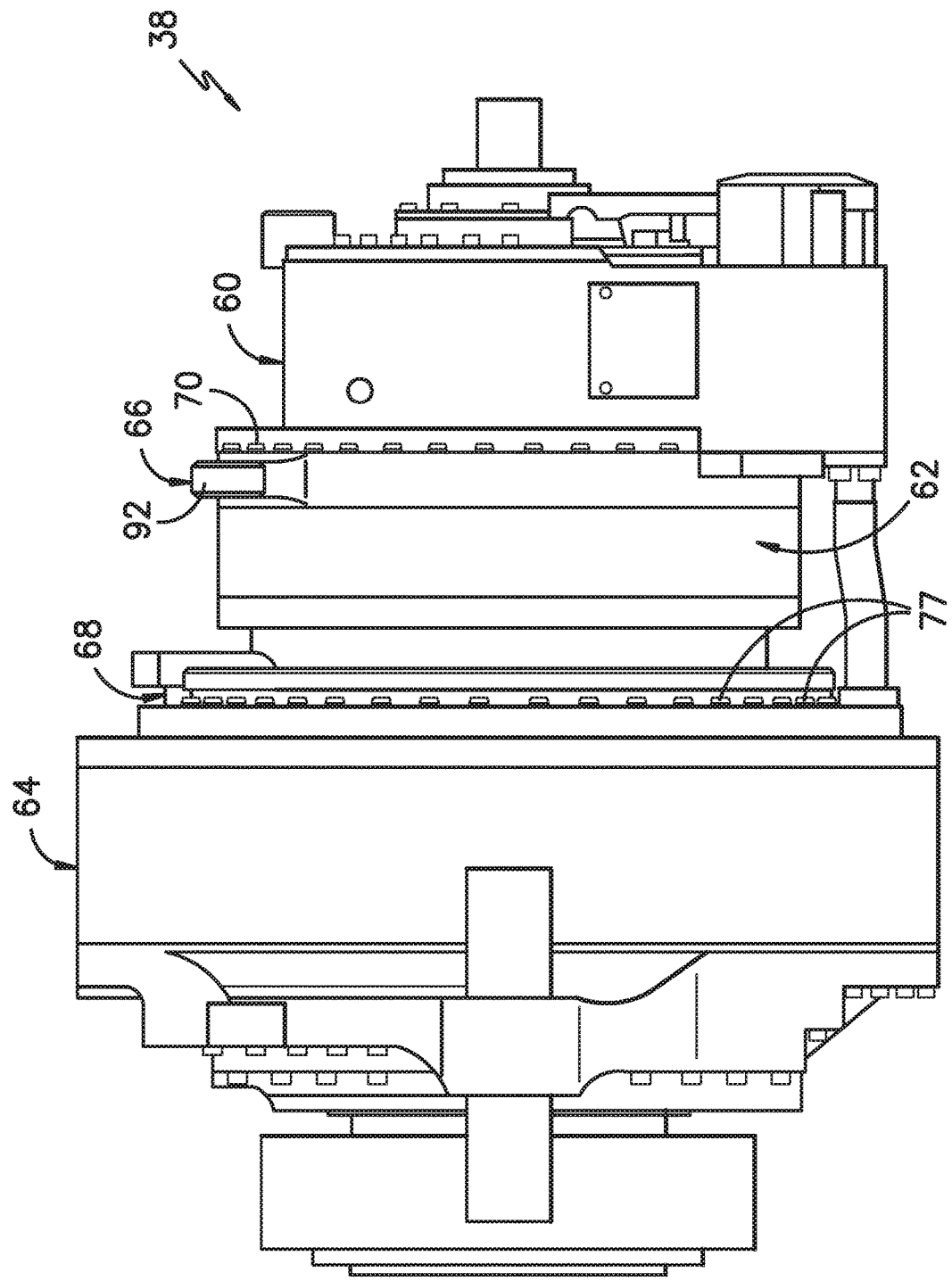

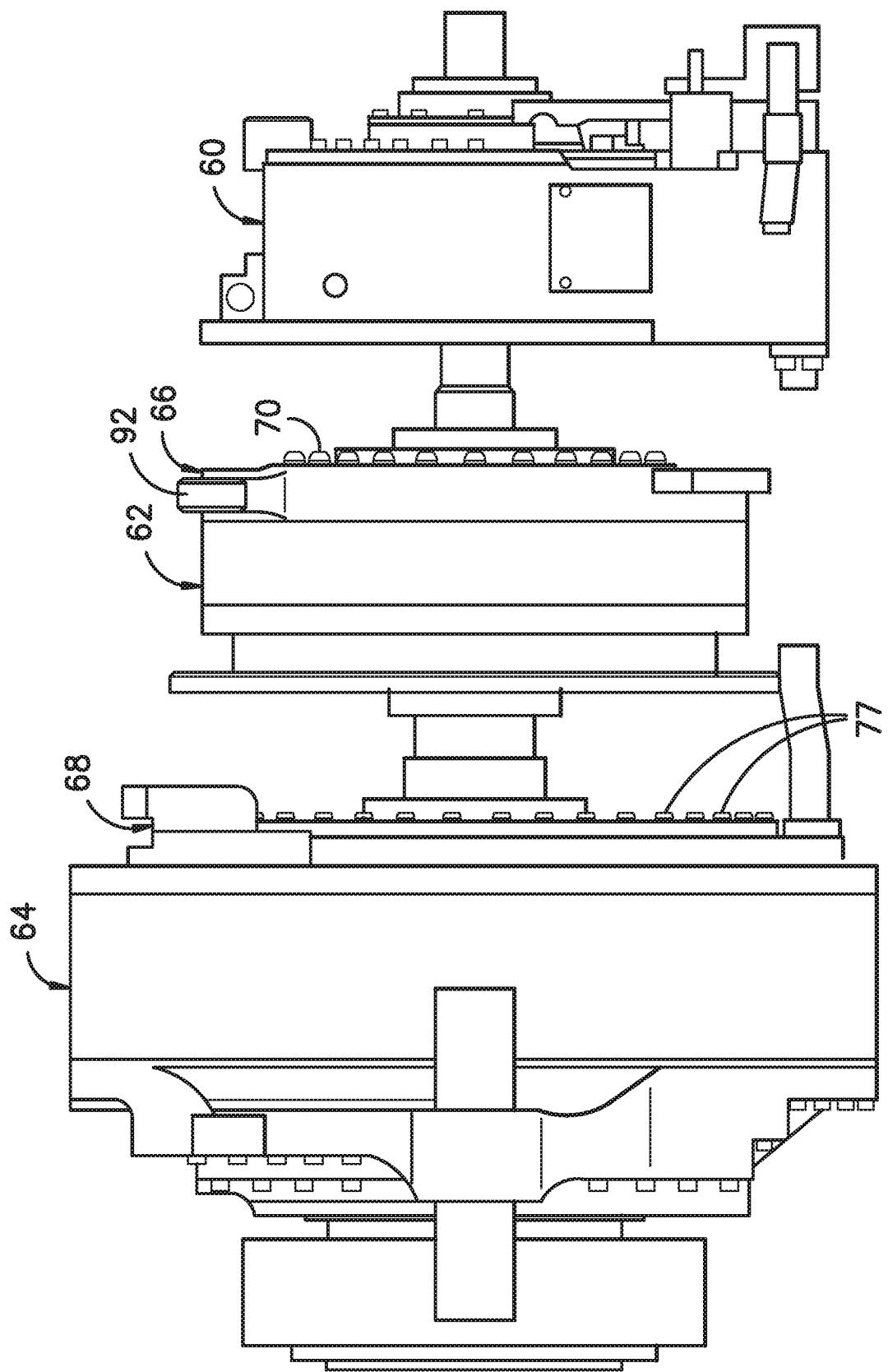

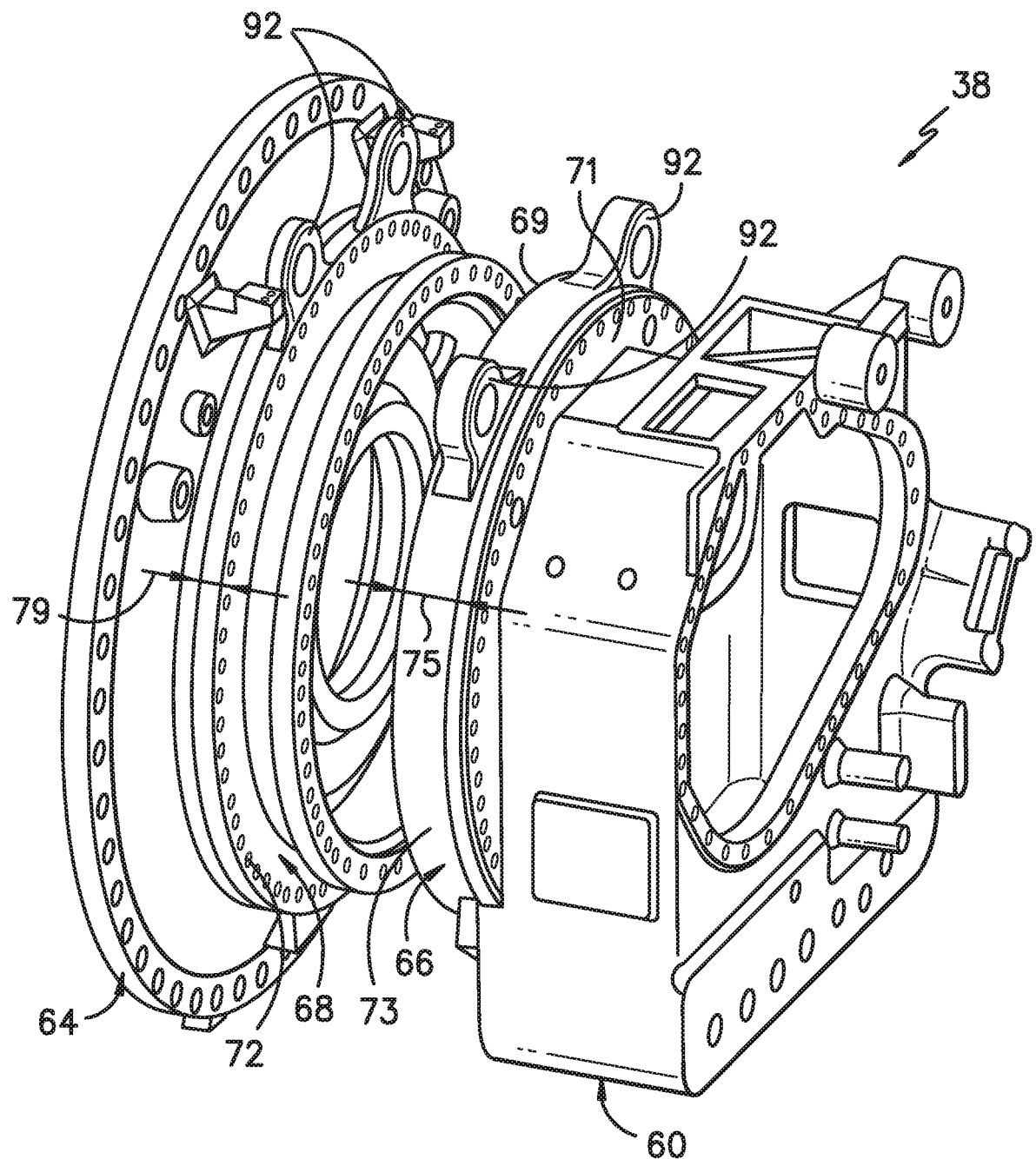
FIG. -6-

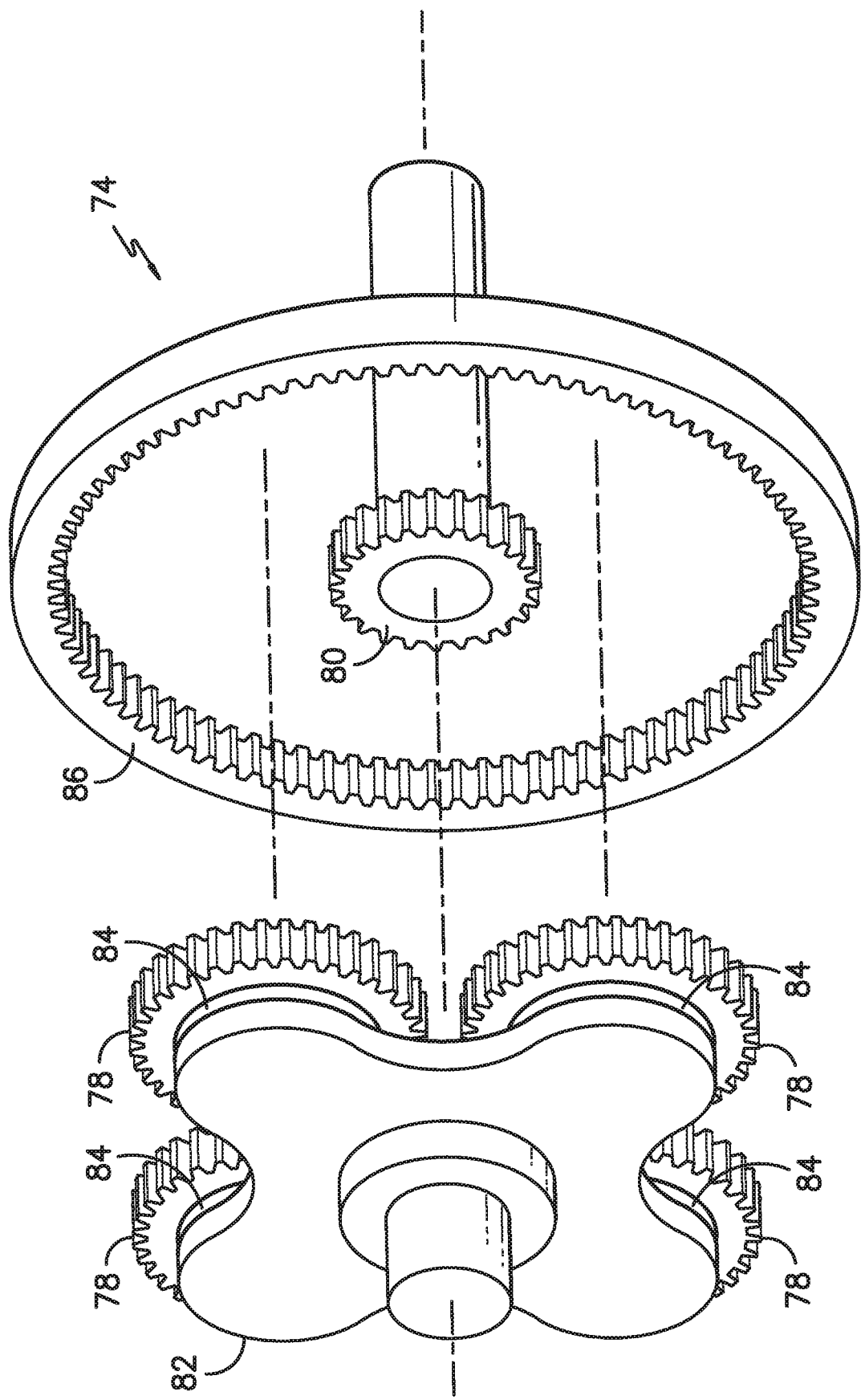
FIG. -7-

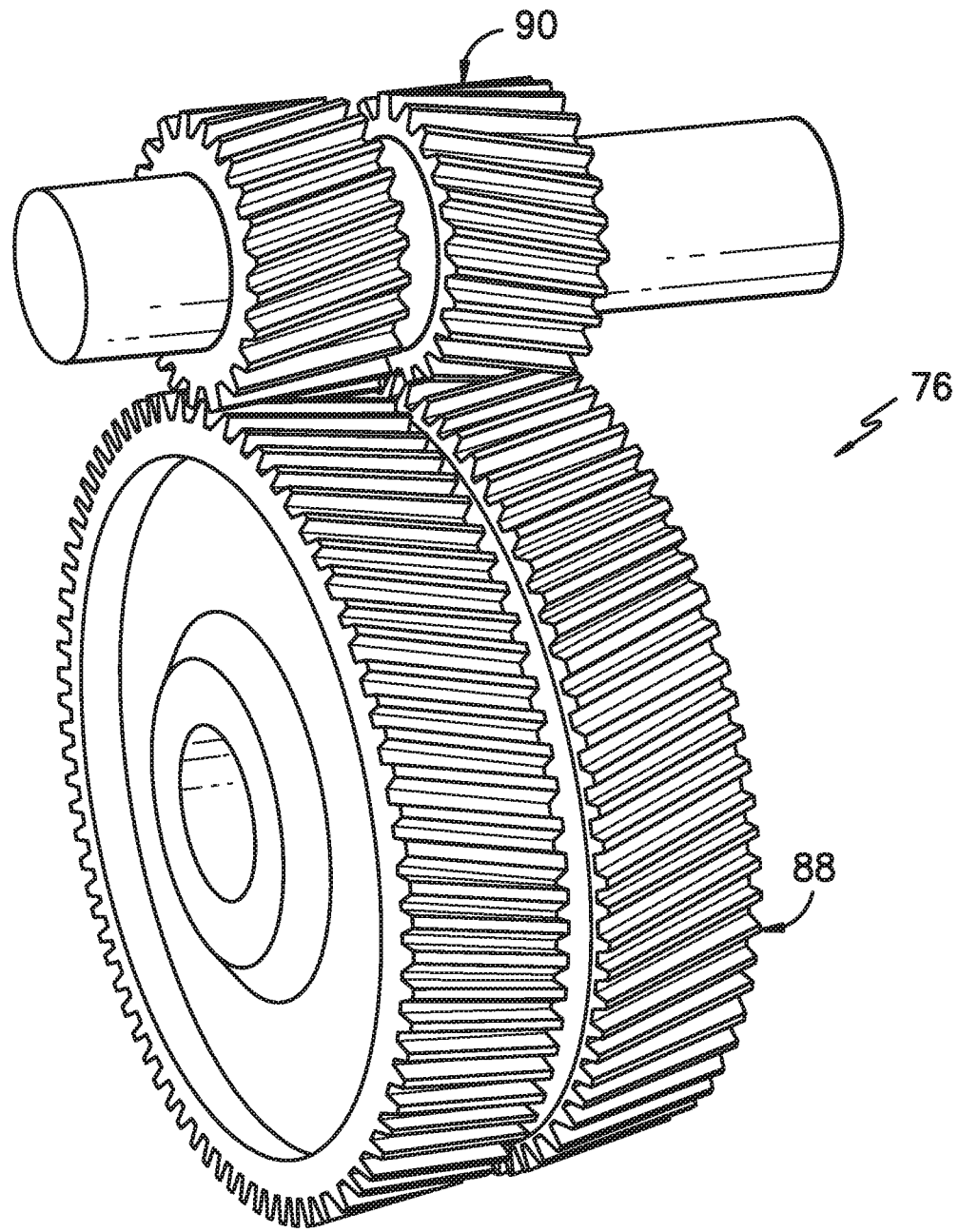
FIG. -8-

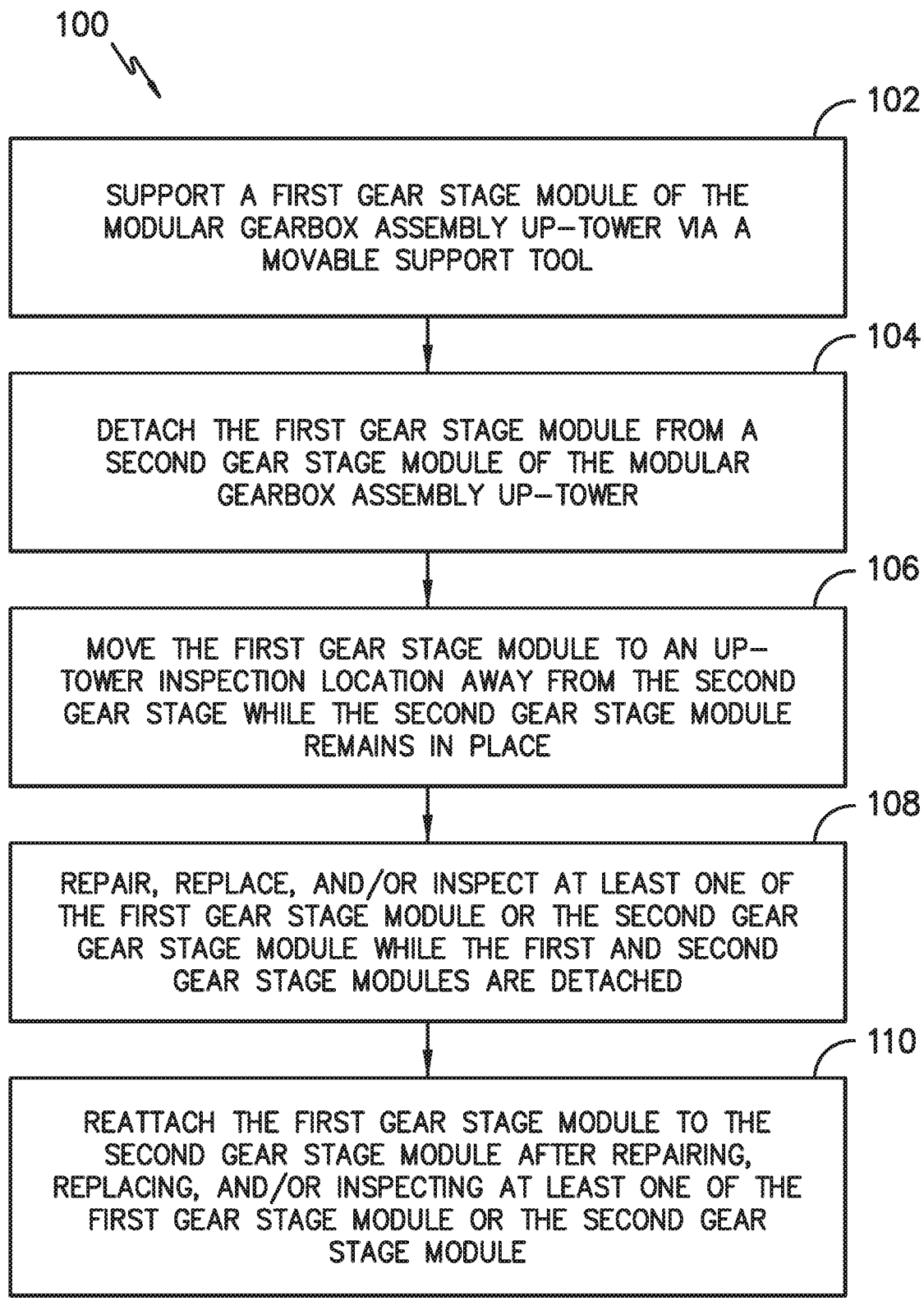
FIG. -9-

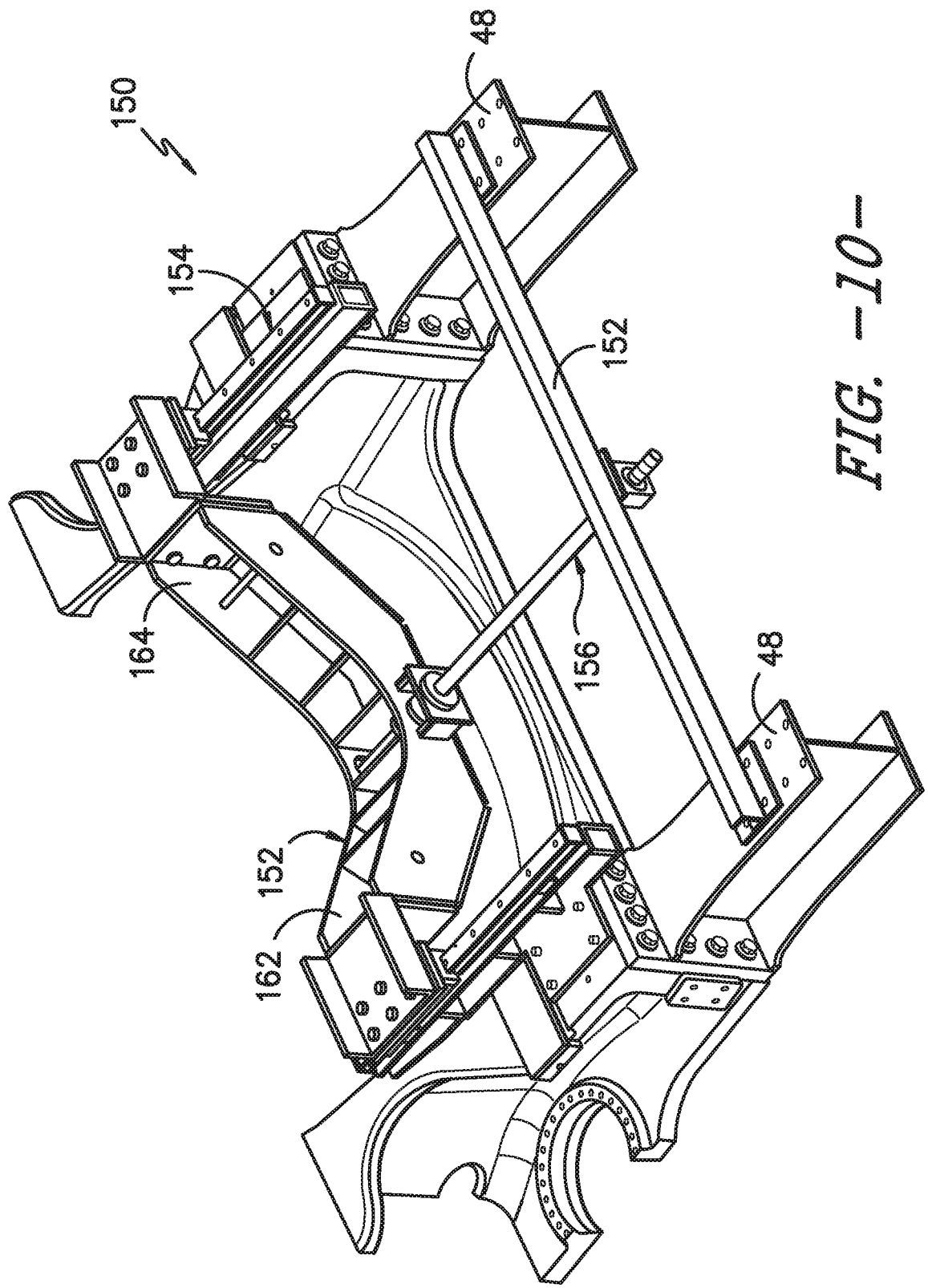

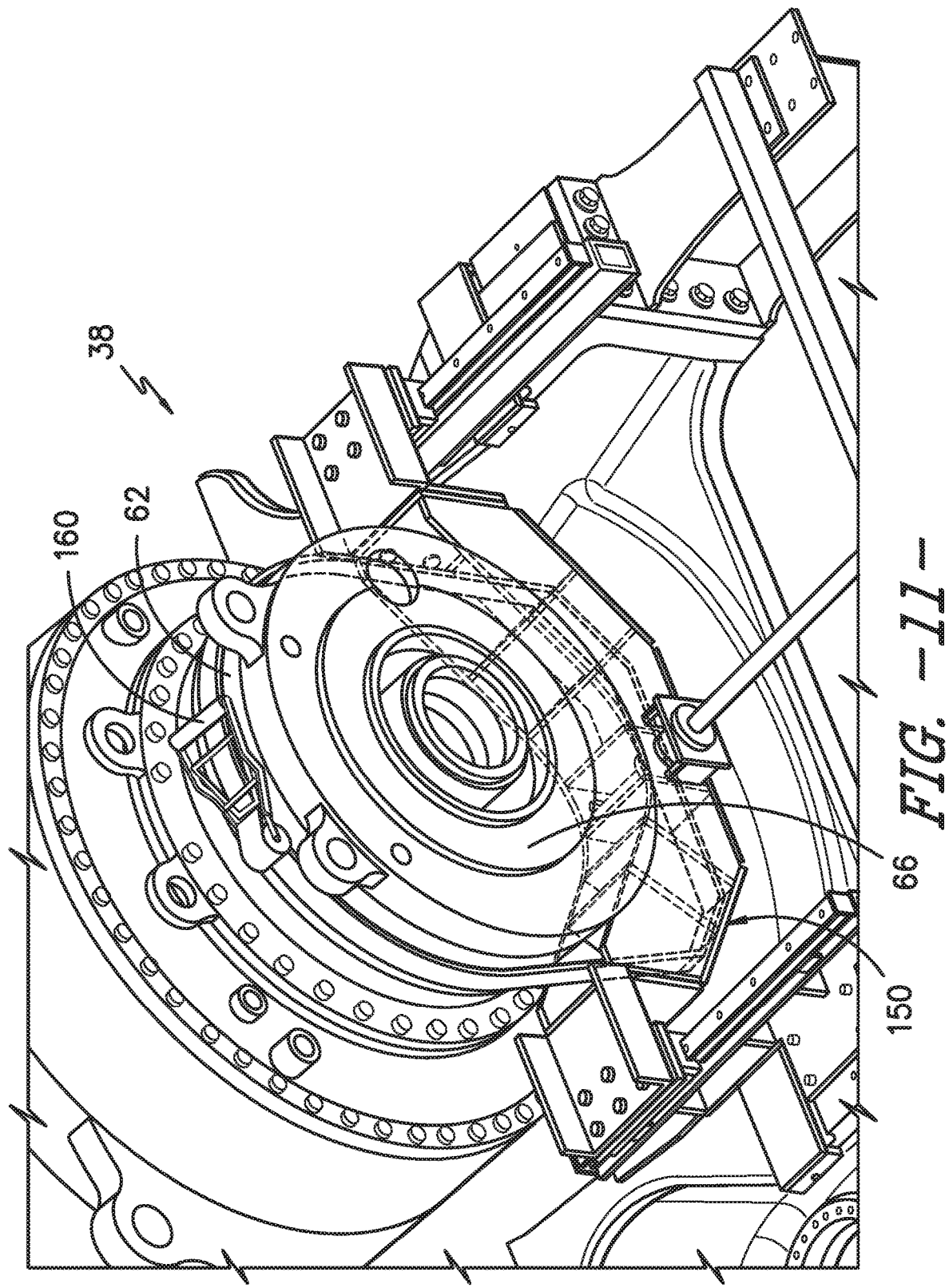

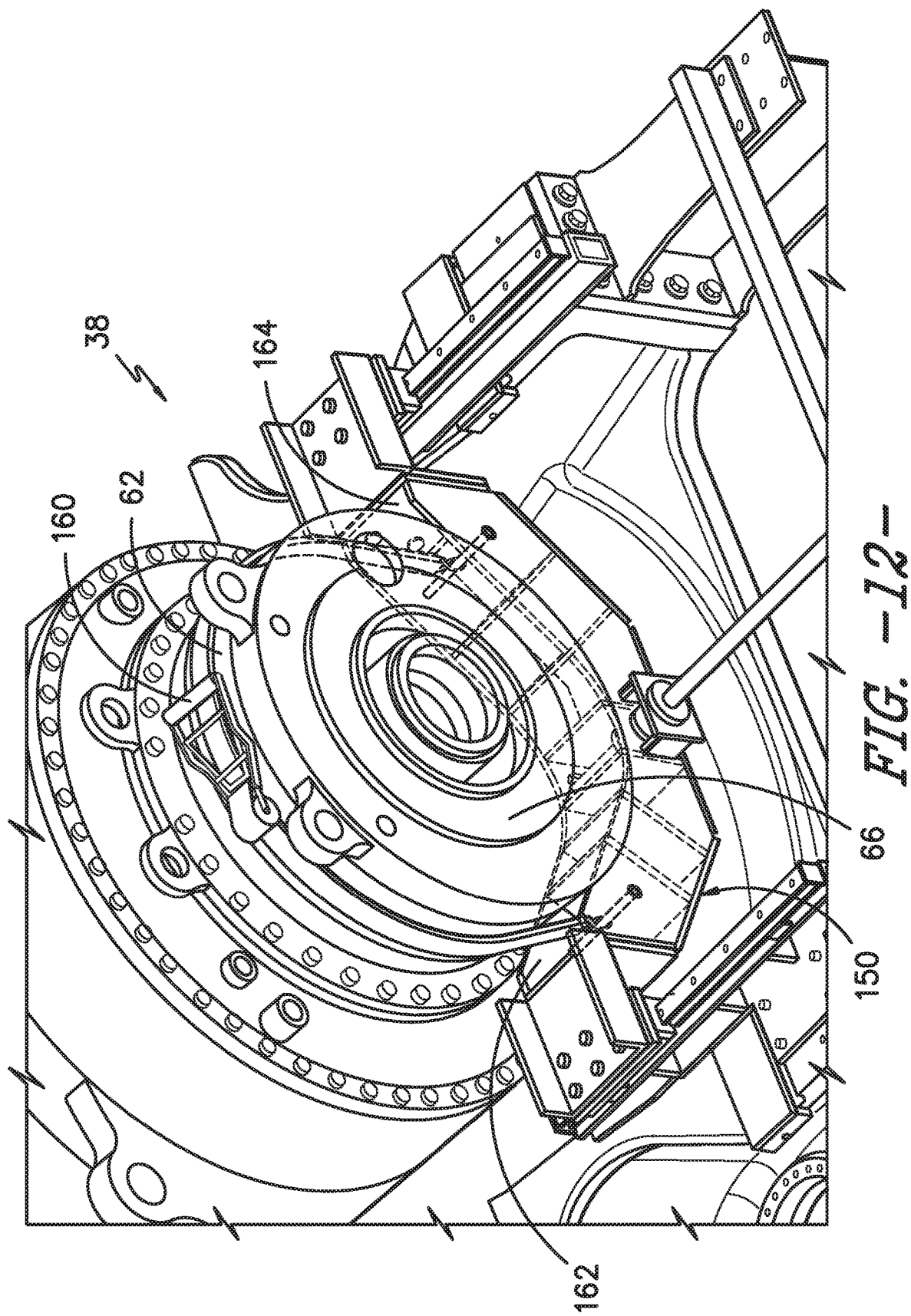

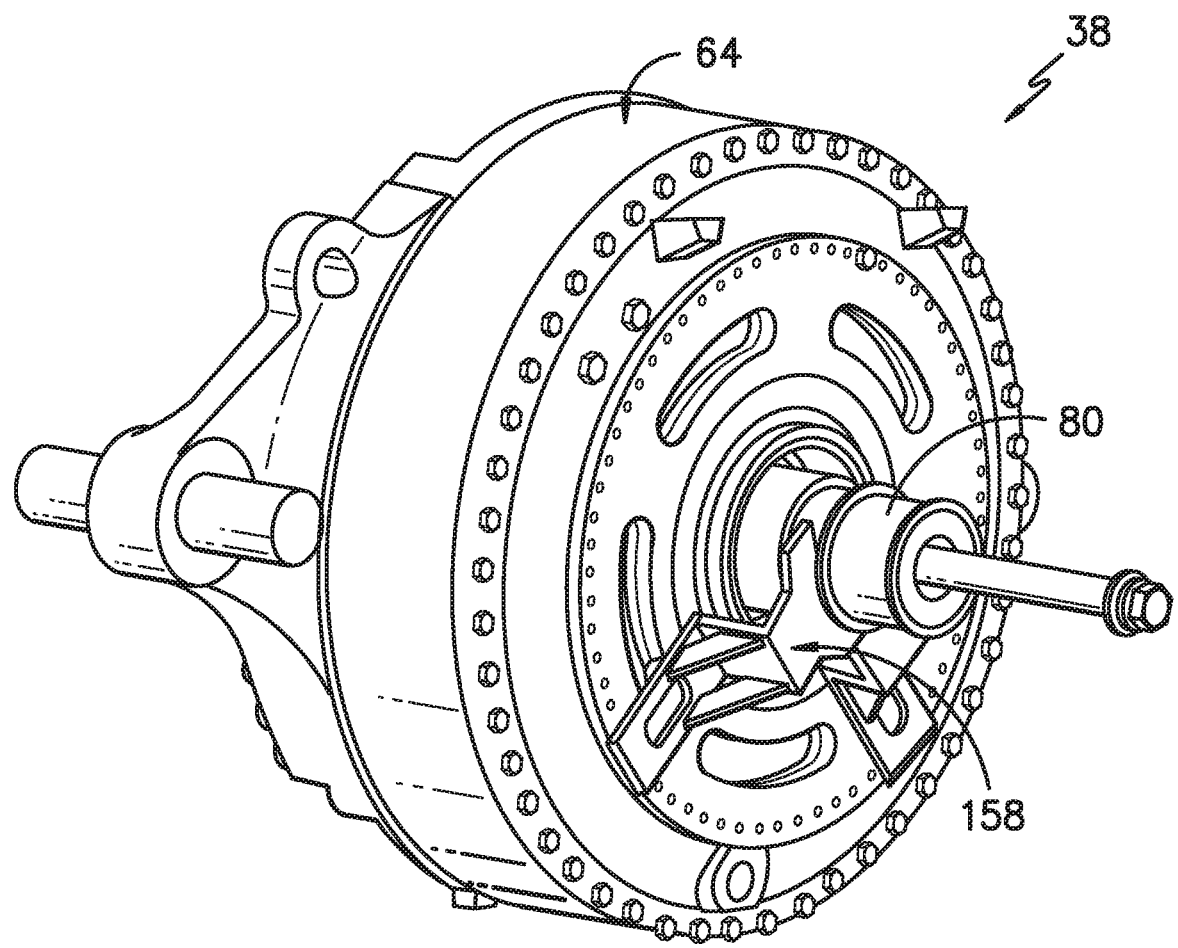
FIG. -13-

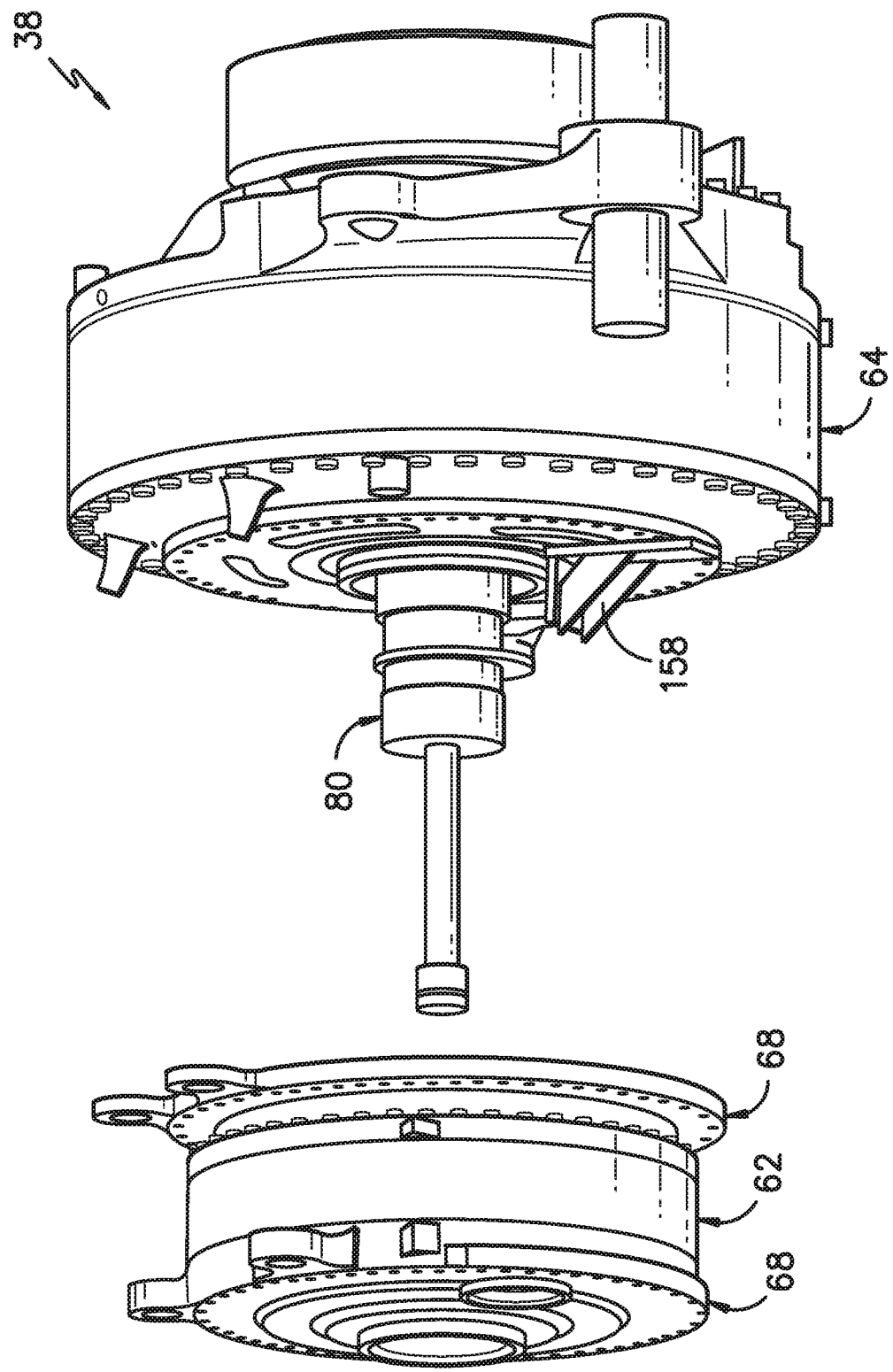
FIG. -14-

MODULAR GEARBOX FOR WIND TURBINE

FIELD

The present disclosure relates in general to wind turbines, and more particularly to a modular gearbox for a wind turbine that provides improved up-tower serviceability.

BACKGROUND

Generally, a wind turbine includes a tower, a nacelle mounted on the tower, and a rotor coupled to the nacelle. The rotor generally includes a rotatable hub and a plurality of rotor blades coupled to and extending outwardly from the hub. Each rotor blade may be spaced about the hub so as to facilitate rotating the rotor to enable kinetic energy to be converted into usable mechanical energy, which may then be transmitted to an electric generator disposed within the nacelle for the production of electrical energy. Typically, a gearbox is used to drive the electric generator in response to rotation of the rotor. For instance, the gearbox may be configured to convert a low speed, high torque input provided by the rotor to a high-speed, low torque output that may drive the electric generator.

As shown in FIG. 1, a conventional wind turbine gearbox 1 generally includes a gearbox housing 2 that contains a low-speed stage 3, an intermediate-speed stage 4, and a high-speed stage 5 of a gear train assembly. Thus, the gear train assembly converts the low-speed, high torque input of the rotor shaft to a high-speed, low torque output for the generator.

If the gearbox 1 needs to be repaired or replaced in the field, conventional methods include using an on-ground crane. More specifically, the on-ground crane is required to remove the gearbox 1 containing all three stages from atop the wind turbine tower to the ground. However, on-ground crane availability, scheduling, and costs, as well as wind turbine down time can make such repair and/or replacement procedures time consuming and expensive.

Accordingly, a modular gearbox assembly for a wind turbine that provides improved up-tower serviceability and that addresses the aforementioned issues would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a modular gearbox assembly for a wind turbine. The gearbox assembly includes a low-speed gear stage module, a separate, intermediate-speed gear stage module adjacent to the low-speed gear stage module, and a separate high-speed gear stage module adjacent to the intermediate-speed gear stage module. In addition, the gearbox assembly includes a first flange removably connecting the intermediate-speed gear stage module to the high-speed gear stage module and a second flange removably connecting the intermediate-speed gear stage module to the low-speed gear stage module. Thus, the low-speed gear stage module converts a low-speed, high torque input from a rotor shaft of the wind turbine to a high-speed, low torque output for a generator of the wind turbine via the intermediate and high-speed gear stage modules. In addition, the first and second flanges allow for easy disassembly of the gear stage modules such that the various stages can be easily repaired, replaced, and/or inspected.

In one embodiment, the first and second flanges may each include one or more attachment points for attaching at least one line from an up-tower crane. In another embodiment, the first and second flanges may each include at least two attachment points for attaching the at least one line from the up-tower crane.

In further embodiments, the first and second flanges may each include first and second side surfaces separated by an outermost circumferential surface that defines a thickness of the first and second flanges, respectively. In such embodiments, the attachment points may be positioned on the outermost circumferential surfaces of the first and second flanges, respectively. More specifically, in certain embodiments, the attachment points may be positioned on an upper half of the first and second flanges, respectively.

In additional embodiments, the gearbox assembly may further include a plurality of fasteners for removably connecting the low-speed gear stage module to the intermediate-speed gear stage module via the second flange and the intermediate-speed gear stage module to the high-speed gear stage module to the first flange, respectively. In such embodiments, the first and second flanges may each include a plurality of through holes extending through the thickness for receiving the plurality of fasteners.

In yet another embodiment, the low-speed gear stage module, the intermediate-speed gear stage module, and the high-speed gear stage module may each include a gear train assembly having a plurality of planet gears, at least one sun gear, and at least one ring gear. In further embodiment, the intermediate-speed gear stage module, and the high-speed gear stage module may each include a helical gear train assembly having at least one pinion gear and at least one bull gear.

In another aspect, the present disclosure is directed to a method for replacing, repairing, and/or inspecting an up-tower modular gearbox assembly for a wind turbine. The method includes supporting a first gear stage module of the modular gearbox assembly up-tower via a movable support tool. The method also includes detaching the first gear stage module from a second gear stage module of the modular gearbox assembly up-tower. The method further includes moving the first gear stage module to an up-tower inspection location away from the second gear stage module while the second gear stage module remain in place. Moreover, the method includes repairing, replacing, and/or inspecting at least one of the first gear stage module or the second gear stage module while the first and second gear stage modules are detached. In addition, the method includes reattaching the first gear stage module to the second gear stage module after repairing, replacing, and/or inspecting at least one of the first or second gear stage modules.

In one embodiment, the step of detaching the first gear stage module from the second gear stage module of the modular gearbox assembly up-tower may further includes removing a first set of fasteners from a first flange removably connecting the first and second gear stage modules together and applying a force to the second gear stage module via the movable support tool to separate the first gear stage module from the second gear stage module. In another embodiment, for example, the force may be applied via one or more hydraulic actuators of the movable support tool.

In further embodiments, the first gear stage module may correspond to a high-gear stage module and the second gear stage module may correspond to a low gear stage module or an intermediate gear stage module. More specifically, in additional embodiments, the modular gearbox assembly may include a third gear stage module. In such embodiments, the first gear stage module may correspond to the high-gear stage module, the second gear stage module may correspond to the intermediate gear stage module, and the first gear stage module may correspond to the low gear stage module.

In several embodiments, the method may include detaching the intermediate gear stage module from the low-speed stage after detaching the high-gear stage module and repairing and/or inspecting at least one of the low, intermediate, or high-gear stage modules while the intermediate and high-gear stage modules are detached. More specifically, in such embodiments, the step of detaching the intermediate gear stage module from the low-speed stage after detaching the high-gear stage module may include removing a second set of fasteners from a second flange removably connecting the intermediate and the high-gear stage modules together.

In particular embodiments, the step of moving the first gear stage module to the up-tower inspection location away from the second gear stage module while the second gear stage module remain in place further includes sliding the first gear stage module along a track of the movable support tool away from the second gear stage module. In similar embodiments, the step of moving the first gear stage module to the up-tower inspection location away from the second gear stage module while the second gear stage module remain in place may include attaching at least one line from an up-tower crane to at least one attachment point on the first flange, lifting the first gear stage module via the up-tower crane, and placing the first gear stage module at the up-tower inspection location via the up-tower crane.

In another aspect, the present disclosure is directed to a modular gearbox assembly for a wind turbine. The modular gearbox includes a first gear stage module, a separate, second gear stage module adjacent to the first gear stage module, and a flange removably connecting the first gear stage module to the second gear stage module. Thus, the first and second gear stage modules convert a low-speed, high torque input from a rotor shaft of the wind turbine to a high-speed, low torque output for a generator of the wind turbine. It should also be understood that the modular gearbox assembly may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a gearbox assembly of a wind turbine according to conventional construction;

FIG. 2 illustrates a perspective view of one embodiment of a wind turbine according to the present disclosure;

FIG. 3 illustrates a detailed, internal view of one embodiment of a nacelle of a wind turbine according to the present disclosure FIG. 4 illustrates a side view of one embodiment of a modular gearbox assembly according to the present disclosure;

FIG. 5 illustrates a side, exploded view of the modular gearbox assembly of FIG. 4;

FIG. 6 illustrates a partial, perspective view of one embodiment of a modular gearbox assembly according to the present disclosure;

FIG. 7 illustrates an exploded view of one embodiment of a planetary gear system of a gearbox of a wind turbine according to the present disclosure;

FIG. 8 illustrates a perspective view of one embodiment of a helical gear system of a gearbox of a wind turbine according to the present disclosure;

FIG. 9 illustrates a flow diagram of one embodiment of a method for repairing, replacing and/or inspecting an up-tower modular gearbox assembly for a wind turbine according to the present disclosure;

FIG. 10 illustrates a perspective view of one embodiment of a movable support tool assembly for supporting one or more gear stage modules of the wind turbine gearbox up-tower according to the present disclosure;

FIG. 11 illustrates a perspective view of one embodiment of a movable support tool assembly supporting an intermediate-speed gear stage module of the wind turbine gearbox up-tower according to the present disclosure, particularly illustrating a strap secured around the intermediate-speed gear stage module and the support tool assembly;

FIG. 12 illustrates a perspective view of another embodiment of a movable support tool assembly supporting an intermediate-speed gear stage module of the wind turbine gearbox up-tower according to the present disclosure, particularly illustrating a strap securing the intermediate-speed gear stage module to the support tool assembly;

FIG. 13 illustrates a partial, perspective view of one embodiment of a separated modular gearbox assembly according to the present disclosure, particularly illustrating an additional support tool supporting the low-speed shaft sun gear thereof; and FIG. 14 illustrates another partial, perspective view of one embodiment of a separated modular gearbox assembly according to the present disclosure, particularly illustrating an additional support tool supporting the low-speed shaft sun gear thereof.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a modular gearbox for a wind turbine that can be easily repaired, replaced, and/or inspected up-tower, thereby eliminating the need for an on-ground crane. More specifically, the modular gearbox of the present disclosure includes several independent gear stages joined together via respective flanges that can be assembled/dissembled up-tower with the aid of an up-tower crane. Thus, for the gearbox design of the present disclosure, the failed gearbox low-speed and intermediate-speed stages can be replaced without replacing the whole gearbox. For example, the disassembly process starts up-tower with removing the high-gear stage components and casing. The intermediate gear stage can then be removed using a movable support tool as needed.

Referring now to the drawings, FIG. 2 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotation of the rotor 18 to enable kinetic energy to be transferred from the wind into usable mechanical energy, and subsequently, electrical energy. For instance, the hub 20 may be rotatably coupled to an electric generator 24 (FIG. 3) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various functions, such as receiving, transmitting and/or executing wind turbine control signals.

Referring now to FIG. 3, a simplified, internal view of one embodiment of the nacelle 16 of the wind turbine 10 shown in FIG. 1 is illustrated. As shown, a drivetrain assembly 30 of the wind turbine 10 is housed within the nacelle 16. More specifically, as shown, the drivetrain assembly 30 includes the generator 24, which is coupled to the rotor 18 for producing electrical power from the rotational energy generated by the rotor 18. For example, as shown, the rotor 18 may include a rotor shaft 34 coupled to the hub 20 for rotation therewith. The rotor shaft 34 may, in turn, be rotatably coupled to a generator shaft 36 of the generator 24 through a gearbox assembly 38 connected to a bedplate support frame 48 by a torque support 50. As is generally understood, the rotor shaft 34 may provide a low-speed, high torque input to the gearbox assembly 38 in response to rotation of the rotor blades 22 and the hub 20. The gearbox assembly 38 may then be configured to convert the low-speed, high torque input to a high-speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 56 communicatively coupled to the controller 26, with each yaw drive mechanism(s) 56 being configured to change the angle of the nacelle 16 relative to the wind (e.g., by engaging a yaw bearing 58 of the wind turbine 10).

Referring now to FIGS. 4-6, various views of the modular gearbox assembly 38 according to the present disclosure is illustrated. FIG. 4 illustrates a side view of the modular gearbox assembly 38 according to the present disclosure. FIG. 5 illustrates a side, exploded view of the modular gearbox assembly 38 according to the present disclosure. FIG. 6 illustrates a partial, perspective view of the modular gearbox assembly 38 according to the present disclosure. As mentioned, the gearbox assembly 38 may be secured to the bedplate support frame 48 via the torque support 50. In contrast to conventional gearboxes (such as gearbox 1 of FIG. 1), however, the modular gearbox assembly 38 of the present disclosure comprises three independent and separate gear stage modules 60, 62, 64. More specifically, as shown particularly in FIGS. 4 and 5, the modular gearbox assembly 38 includes a first gear stage module 60, a second gear stage module 62, and a third gear stage module 64. For example, as shown in the illustrated embodiment, the three gear stage modules correspond to the low-speed gear stage module 64, an intermediate-speed gear stage module 62, and a high-speed gear stage module 60. In addition, as shown, the independent stages 60, 62, 64 are removably connected together via first and second flanges 66, 68 and a plurality of connecting fasteners 70 that extend in through holes 72 of the first and second flanges 66, 68. Thus, the low-speed gear stage module 64 converts a low-speed, high torque input from the rotor shaft 34 of the wind turbine 10 to a high-speed, low torque output for the generator 24 of the wind turbine 10 via the intermediate and high-speed gear stage modules 62, 60.

In addition, the first and second flanges 66, 68 allow for easy disassembly of the gear stage modules 60, 62, 64 such that the various stages can be easily repaired, replaced, and/or inspected independently. For example, as shown in the illustrated embodiment, the gearbox assembly 38 may include a plurality of connecting fasteners 70, 77 for removably connecting the gear stage modules 60, 62, 64 together (e.g. a second set of connecting fasteners 77 for connecting the low-speed gear stage module 64 to the intermediate-speed gear stage module 62 via the second flange 68 and a first set of connecting fasteners 70 for connecting the intermediate-speed gear stage module 62 to the high-speed gear stage module 60 to the first flange 66, respectively). In such embodiments, as shown in FIG. 6, the first and second flanges 66, 68 may each include a plurality of through holes 72 extending through their respective thicknesses 75, 79 of each respective flange 66, 68 for receiving the plurality of fasteners 70.

Each gear stage modules 60, 62, 64 of the gearbox assembly 38 may include any suitable gear assembly that uses one or more gears and/or gear trains to provide speed and/or torque conversions from the rotor shaft 34 to the generator 24. For example, in one non-limiting embodiment, the low-speed and intermediate-speed gear stage modules 64, 62 may correspond to planetary gear stages 74, whereas the high-speed gear stage 60 may correspond to a helical gear stage 76. For example, as shown in FIG. 7, a planetary gear system 74 having one or more outer or planet gears 78 revolving about a central or sun gear 80 is illustrated. In addition, the planet gears 78 are typically mounted on a movable arm or carrier 82 which itself may rotate relative to the sun gear 80. Moreover, as shown, each individual planet gear 78 may be mounted around a pin shaft 84 so as to individually rotate around its respective pin shaft 84. The gearbox assembly 38 may also include at least one outer ring gear 86 configured to mesh the planet gears 78. Thus, a typical ring gear 86, as shown, generally includes a set of gear teeth on an inner circumferential surface thereof that are configured to mesh with corresponding teeth of the planet gears 78. FIG. 8 illustrates a helical gear system 76 having a central gear 88 and a pinion 90. In another non-limiting embodiment, the intermediate and high-speed gear stage modules 62, 60 may correspond to a helical gear stage, whereas the low-speed gear stage 64 may correspond to a planetary gear stage. Also, in another non-limiting embodiment, the low, intermediate and high-speed gear stage modules 64, 62, 60 may correspond to planetary gear stages.

Referring back to FIGS. 4-6, the first and second flanges 66, 68 may each include one or more attachment points 92 for attaching at least one line from an up-tower crane. For example, as shown in the illustrated embodiment, the first and second flanges 66, 68 each include two attachment points 92 for attaching one or more lines from an up-tower crane (not shown). As shown particularly in FIG. 6, the first and second flanges 66, 68 may each include first and second side surfaces 69, 71 separated by an outermost circumferential surface 73 that defines the thicknesses 75, 79 of the first and second flanges 66, 68, respectively. In such embodiments, as shown, the attachment points 92 may be positioned on the outermost circumferential surfaces 73 of the first and second flanges 66, 68, respectively. More specifically, as shown, the attachment points 92 may be positioned on an upper half of the first and second flanges 66, 68, respectively.

Referring now to FIG. 9, a flow diagram of one embodiment of a method 100 for repairing, replacing, and/or inspecting the modular gearbox assembly 38 described herein while the gearbox assembly 38 is up-tower is illustrated. As shown at 102, the method 100 includes supporting a first gear stage module of the modular gearbox assembly 38 up-tower via a movable support tool 150. For example, as shown in FIGS. 10-12, various views of one embodiment of the movable support tool assembly 150 described herein is illustrated. As shown in FIG. 10, the movable support tool assembly 150 may include one or more support members 152 configured to cradle or support at least one of the gear stage modules 60, 62, 64 of the gearbox assembly 38. In addition, as shown in FIGS. 11 and 12, one or more pre-strained straps 160 (such as a ratchet strap) may be used to secure one of the gear stage modules 60, 62, 64, such as the intermediate-speed gear stage module 62, atop the support tool assembly 150. As shown particularly in FIG. 11, the strap(s) 160 may be secured around one of the gear stage modules 60, 62, 64 and the support tool assembly 150. Alternatively, as shown in FIG. 12, the strap(s) 160 may be secured around the respective gear stage modules 60, 62, 64 and directly to the support tool assembly 150, e.g. on opposing sides 162, 164 thereof.

Referring back to FIG. 9, as shown at 104, the method 100 includes detaching a first gear stage module from a second gear stage module of the modular gearbox assembly 38 up-tower. In one embodiment, for example, the first gear stage module may correspond to a high-speed gear stage module 60 and the second gear stage module may correspond to a low-speed gear stage module 64 or an intermediate-speed gear stage module 62. More specifically, as described herein, the modular gearbox assembly 38 may include a third gear stage module. In such embodiments, the first gear stage module may correspond to the high-speed gear stage module 60, the second gear stage module may correspond to the intermediate-speed gear stage module 62, and the first gear stage module may correspond to the low-speed gear stage module 64.

Referring to FIGS. 6, 10, and 14, in a non-limiting embodiment, the first gear stage module may be detached from the second gear stage module by removing a first set of connecting fasteners 70 from a first flange 66 removably connecting the first and second gear stage modules together and applying a force to the second gear stage via the movable support tool 150 to separate the first gear stage from the second gear stage. In certain embodiments, for example, the force may be applied via one or more hydraulic actuators 156 of the movable support tool 150.

More specifically, where the gearbox assembly 38 includes three gear stages, the method 100 may include detaching the intermediate-speed gear stage module 62 from the low-speed stage module 64 after detaching the high-speed gear stage module 60. In such embodiments, the intermediate-speed gear stage module 62 may be detached from the low-speed stage module 64 after detaching the high-speed gear stage module 60 by removing a second set of connecting fasteners 70 from a second flange 68 removably connecting the intermediate-speed and the high-speed gear stage modules 62, 60 together. In addition, as shown particularly in FIGS. 13 and 14, an additional support tool 158 may be used to enable the separation of the low-speed gear stage module 64 from the intermediate-speed gear stage module 62. More specifically, as shown in the illustrated embodiment, the additional support tool 158 supports the low speed shaft sun gear during the separation process.

Referring back to FIG. 9, as shown at 106, the method 100 also includes moving the first gear stage module to an up-tower inspection location away from the second gear stage while the second gear stage module remain in place. For example, as shown in FIG. 10, the support member(s) 152 may be movable along a track 154. Thus, the support member(s) 152 are configured to support the weight of one of the gear stage modules 60, 62, 64 and can be slid along the track 154 to separate the modules 60, 62, 64 from each other. It should be understood that the support member(s) 152 may be moved along the track manually or automatically using any suitable means, including for example, the hydraulic actuator(s) 156 (as shown) as well as any other mechanical or electrical devices and/or combinations thereof.

In similar embodiments, the first gear stage module may be moved to the up-tower inspection location away from the second gear stage while the second gear stage module remains in place by attaching one or more lines from an up-tower crane to the attachment points 92 on the first flange 66, lifting the first gear stage module via the up-tower crane, and placing the first gear stage module at the up-tower inspection location via the up-tower crane.

Referring still to FIG. 9, as shown at 108, the method 100 includes replacing, repairing and/or inspecting at least one of the first gear stage module or the second gear stage module while the first and second gear stage modules are detached. As shown at 110, the method 100 includes reattaching the first gear stage module to the second gear stage module after repairing and/or replacing at least one of the first gear stage module or the second gear stage module.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A modular gearbox assembly for a wind turbine, the gearbox assembly comprising:
    a low-speed gear stage module;
    a separate, intermediate-speed gear stage module adjacent to the low-speed gear stage module;
    a separate, high-speed gear stage module adjacent to the intermediate-speed gear stage module;
    a separate, first flange removably connecting the intermediate-speed gear stage module to the high-speed gear stage module;
    a separate, second flange removably connecting the intermediate-speed gear stage module to the low-speed gear stage module, wherein each of the separate, first and second flanges comprises a ring-shaped configuration having a first side surface and an opposing, second side surface, the first and second side surfaces being opposite each other at a same radial distance from a rotational axis of the gearbox assembly;
    a plurality of first fastening components that connect the high-speed gear stage module to the first side surface of the first flange and the intermediate-speed gear stage module to the second side surface of the first flange;
    a plurality of second fastening components that connect the intermediate-speed gear stage module to the first side surface of the second flange and the low-speed gear stage module to the second side surface of the second flange; and
    the low-speed gear stage module converting a low-speed, high torque input from a rotor shaft of the wind turbine to a high-speed, low torque output for a generator of the wind turbine via the intermediate and high-speed gear stage modules.

2. The gearbox assembly of claim 1, wherein the first and second flanges each comprise at least one attachment point for attaching at least one line from an up-tower crane.

3. The gearbox assembly of claim 2, wherein the at least one attachment point is positioned on the outermost surfaces of the first and second flanges, respectively.

4. The gearbox assembly of claim 2, wherein the at least one attachment point is positioned on an upper half of the first and second flanges, respectively.

5. The gearbox assembly of claim 1, wherein the first and second flanges each comprise a plurality of through holes for receiving the plurality of first and second fastening components, respectively.

6. The gearbox assembly of claim 1, wherein the low-speed gear stage module, the intermediate-speed gear stage module, and the high-speed gear stage module each comprise a gear train assembly, the gear train assembly comprising a planetary gear system.

7. A modular gearbox assembly for a wind turbine, comprising:
    a first gear stage module;
    a separate, second gear stage module adjacent to the first gear stage module; and,
    a separate flange removably connecting the first gear stage module to the second gear stage module;
    the first and second gear stage modules converting a low-speed, high torque input from a rotor shaft of the wind turbine to a high-speed, low torque output for a generator of the wind turbine,
    wherein the separate flange comprises a ring-shaped configuration having a first side surface and an opposing, second side surface, the first and second side surfaces being opposite each other at a same radial distance from a rotational axis of the gearbox assembly; and
    a plurality of first fastening components that connect the first gear stage module to the first side surface of the first flange and the second gear stage module to the second side surface of the first flange.

8. The gearbox assembly of claim 7, wherein the separate flange comprises at least one attachment point for attaching at least one line from an up-tower crane.

* * * * *